US012600359B2

(12) United States Patent
Ackert et al.

(10) Patent No.: US 12,600,359 B2
(45) Date of Patent: Apr. 14, 2026

(54) TARGET OBJECT SELECTION FOR A LONGITUDINAL GUIDANCE SYSTEM AND ELECTRONIC VEHICLE GUIDANCE SYSTEM OF A MOTOR VEHICLE

(71) Applicant: Volkswagen Aktiengesellschaft, Wolfsburg (DE)

(72) Inventors: Lukas Ackert, Braunschweig (DE); Jannis Hoppe, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 50 days.

(21) Appl. No.: 18/658,535

(22) Filed: May 8, 2024

(65) Prior Publication Data

US 2024/0375661 A1      Nov. 14, 2024

(30) Foreign Application Priority Data

May 12, 2023    (DE) .......................... 102023204457.9

(51) Int. Cl.
        B60W 30/18          (2012.01)
        B60W 30/09          (2012.01)
        B60W 30/095         (2012.01)

(52) U.S. Cl.
        CPC ...... B60W 30/18163 (2013.01); B60W 30/09 (2013.01); B60W 30/095 (2013.01);
                    (Continued)

(58) Field of Classification Search
        CPC .......... B60W 30/18163; B60W 30/09; B60W 30/095; B60W 2552/15; B60W 2552/30;
                    (Continued)

(56) References Cited

U.S. PATENT DOCUMENTS 7,392,120 B2 *   6/2008   Matsumoto .......... B62D 15/025
                                                            701/91
11,151,880 B1 *  10/2021  Shou .................... G08G 1/0141
                    (Continued)

FOREIGN PATENT DOCUMENTS

DE            19637245 A1      3/1998
DE            10012737 A1      9/2001
                    (Continued)

OTHER PUBLICATIONS

EP-3016828-B1 machine translation (Year: 2019).*
                    (Continued)

*Primary Examiner* — Angelina M Shudy
(74) *Attorney, Agent, or Firm* — Peter Zura; LOZA & LOZA, LLP

(57)            ABSTRACT

Technologies and techniques for selecting a target object for a longitudinal guidance system of a motor vehicle. A method includes adapting a driving parameter of the motor vehicle based on the target object. Initially, the motor vehicle is operated along a designated driving lane, adjusting the driving parameter in response to a first target object traveling ahead in the same lane. Additionally, a semi-automated lane change is initiated, transitioning the vehicle from the initial driving lane to an adjacent target driving lane and shifting focus from the first to a second target object in the new lane. If this lane change process is interrupted or aborted, the method assesses the likelihood that the vehicle will revert to the original driving lane. Depending on this likelihood, the control system either maintains the second target object, reselects the first target object, or discontinues target object selection for the continuation of the journey.

20 Claims, 3 Drawing Sheets

(52) U.S. Cl.
    CPC ..... *B60W 2552/15* (2020.02); *B60W 2552/30* (2020.02); *B60W 2554/40* (2020.02); *B60W 2556/00* (2020.02)

(58) Field of Classification Search
    CPC ......... B60W 2554/40; B60W 2556/00; B60W 2510/202; B60W 2540/18; B60W 2540/215; B60W 2556/50; B60W 30/16; B60W 10/04; B60W 10/18; B60W 50/14; B60W 30/12; B60W 40/04; B60W 2554/80; G05D 1/00; G08G 1/00; G01C 21/00
    See application file for complete search history.

(56) References Cited

U.S. PATENT DOCUMENTS

| | | | | |
|---|---|---|---|---|
| 11,396,296 | B2 * | 7/2022 | Tsuji | B60W 30/18163 |
| 11,402,839 | B2 * | 8/2022 | Sadat | B60W 60/0027 |
| 11,780,474 | B2 * | 10/2023 | Taniguchi | B60W 30/10 701/26 |
| 11,970,163 | B2 * | 4/2024 | Fujii | B60W 30/0956 |
| 12,077,186 | B1 * | 9/2024 | Schleede | B60W 60/0016 |
| 12,269,474 | B2 * | 4/2025 | Yamamoto | G08G 1/167 |
| 12,330,651 | B2 * | 6/2025 | Voigt | B60W 30/09 |
| 2005/0228588 | A1 * | 10/2005 | Braeuchle | B60W 50/0097 701/301 |
| 2006/0178789 | A1 * | 8/2006 | Kuge | B62D 15/0255 701/1 |
| 2008/0303696 | A1 * | 12/2008 | Aso | G08G 1/161 340/933 |
| 2009/0212930 | A1 * | 8/2009 | Pfeiffer | G08G 1/167 701/41 |
| 2010/0042282 | A1 * | 2/2010 | Taguchi | B60W 30/16 701/25 |
| 2011/0190972 | A1 * | 8/2011 | Timmons | G08G 1/167 701/31.4 |
| 2011/0251768 | A1 * | 10/2011 | Luo | G06V 20/58 701/1 |
| 2015/0149039 | A1 * | 5/2015 | Fu | B62D 15/025 701/41 |
| 2015/0197249 | A1 * | 7/2015 | Sakima | B60W 30/16 701/96 |
| 2015/0360684 | A1 * | 12/2015 | Matsuno | B60W 30/18163 701/23 |
| 2016/0001776 | A1 * | 1/2016 | Kim | B60W 30/165 701/96 |
| 2016/0107687 | A1 | 4/2016 | Yamaoka | |
| 2016/0137199 | A1 * | 5/2016 | Kühne | B60W 50/14 701/41 |
| 2017/0235305 | A1 * | 8/2017 | Jung | B60W 50/12 701/23 |
| 2017/0242435 | A1 * | 8/2017 | Nilsson | G08G 1/167 |
| 2017/0305422 | A1 * | 10/2017 | Ito | B60W 50/14 |
| 2018/0015922 | A1 * | 1/2018 | McNew | B60W 10/04 |
| 2018/0178714 | A1 * | 6/2018 | Fujii | B60W 30/16 |
| 2018/0244153 | A1 * | 8/2018 | Ejiri | B60R 11/04 |
| 2018/0345959 | A1 * | 12/2018 | Fujii | B60W 30/0953 |
| 2018/0345960 | A1 * | 12/2018 | Fujii | B60W 30/0953 |
| 2018/0346027 | A1 * | 12/2018 | Fujii | B60K 35/28 |
| 2018/0357904 | A1 | 12/2018 | Miyata | |
| 2019/0088137 | A1 * | 3/2019 | Yamada | B60R 1/12 |
| 2019/0118806 | A1 * | 4/2019 | Augst | B60W 30/18163 |
| 2019/0263401 | A1 * | 8/2019 | Yoo | B60W 60/0015 |
| 2020/0047749 | A1 * | 2/2020 | Morotomi | B60W 30/09 |
| 2020/0097008 | A1 * | 3/2020 | Sadat | B60W 50/0097 |
| 2020/0346667 | A1 * | 11/2020 | Kanoh | B60W 30/165 |
| 2021/0049379 | A1 * | 2/2021 | Lee | B60K 35/10 |
| 2021/0155234 | A1 * | 5/2021 | Kohler | B60W 30/14 |
| 2022/0048513 | A1 * | 2/2022 | Xu | B60W 30/18163 |
| 2022/0111834 | A1 * | 4/2022 | Yang | B60W 30/143 |
| 2023/0037367 | A1 * | 2/2023 | Qian | B60W 30/18163 |
| 2023/0192190 | A1 * | 6/2023 | Takahashi | B62D 15/0255 701/41 |
| 2024/0116510 | A1 * | 4/2024 | Li | B60K 35/22 |
| 2024/0140439 | A1 * | 5/2024 | Nishiwaki | B60W 40/04 |
| 2024/0182022 | A1 * | 6/2024 | Hashimoto | B60W 30/0956 |
| 2024/0239343 | A1 * | 7/2024 | Araki | B60W 40/04 |
| 2024/0391463 | A1 * | 11/2024 | Hoppe | B60W 30/18163 |
| 2025/0065873 | A1 * | 2/2025 | Detering | B60W 60/0015 |

FOREIGN PATENT DOCUMENTS

| | | | | |
|---|---|---|---|---|
| DE | 102006043149 | A1 | 3/2008 | |
| DE | 102009033800 | A1 | 3/2010 | |
| DE | 112018000174 | T5 | 8/2019 | |
| EP | 3016828 | B1 * | 3/2019 | ........ B60W 30/0956 |
| JP | 7274014 | B1 * | 5/2023 | ............ G08G 1/166 |

OTHER PUBLICATIONS

JP-7274014-B1 machine translation (Year: 2023).*
Corresponding EP Application No. 24173427.6. Extended Search Report (Oct. 10, 2024).

* cited by examiner

TARGET OBJECT SELECTION FOR A LONGITUDINAL GUIDANCE SYSTEM AND ELECTRONIC VEHICLE GUIDANCE SYSTEM OF A MOTOR VEHICLE

RELATED APPLICATIONS

The present application claims priority to German Patent Application No. 10 2023 204 457.9 to Ackert et al., filed May 12, 2023, the contents of which is incorporated by reference in its entirety herein.

TECHNICAL FIELD

The present disclosure relates to technologies and techniques for selecting a target object for a longitudinal guidance system of a motor vehicle. At least one driving parameter of the motor vehicle, for example a presently driven speed of the motor vehicle, can be adapted by the longitudinal guidance system based on the selected target object. The target object may be, for example, another motor vehicle, which is driving ahead of the motor vehicle or ego vehicle along an ego driving lane. The longitudinal guidance system, which can be an automatic adaptive cruise control system of the motor vehicle may be configured to be an integral part of an electronic vehicle guidance system of the motor vehicle. Further aspects of the present disclosure relate to such an electronic vehicle guidance system and to a motor vehicle comprising such a system.

BACKGROUND

Modern vehicles in general comprise a longitudinal guidance system and a transverse guidance system, wherein actions of the motor vehicle that relate the movement thereof in the longitudinal direction or parallel to the vehicle longitudinal direction can be controlled by the longitudinal guidance system. The transverse guidance system, in contrast, can be used to influence or control actions of the motor vehicle which relate to a movement of the motor vehicle along a direction transverse to the described longitudinal guidance direction. Longitudinal guidance systems can thus, in particular, control actions relating to an acceleration and/or a deceleration of the motor vehicle, while transverse guidance systems primarily control actions of the motor vehicle relating to a steering movement of the motor vehicle.

A known example of a longitudinal guidance system is an automatic adaptive cruise control or ACC system. Such a system ensures that no drop below a predetermined distance occurs between the motor vehicle and a preceding motor vehicle, which can be selected as the target object for the longitudinal guidance system.

It is also known that a driving lane change that is carried out in an at least semi-automated manner can be initiated by a transverse guidance system of a motor vehicle. Such a driving lane change can be triggered, for example, by the actuation of a turn signal. During the course of such a driving lane change or lane change process, during which the motor vehicle changes from the ego driving lane onto a target driving lane adjoining the ego driving lane, a new target object can be selected along the target driving lane for the described longitudinal guidance system. in other words, starting with the initiation of the lane change process, a behavior of the motor vehicle is no longer adapted based on a previously selected target object along the ego driving lane, but based on the new target object along the target driving lane.

Methods for assisting a driver with preparing for or carrying out a described driving lane change are known from DE 10 2006 043 149 A1, DE 11 2018 000 174 T5, and also from DE 10 2009 033 800 A1. It is provided, amongst others, to change the target object back to the target object of the ego driving lane when the driving lane change is aborted. Disadvantageously, it is possible that the control action is applied for an unnecessarily long time to target objects along the target driving lane of the aborted lane change process. In this way, comfort distances or safety distances may possibly be violated.

SUMMARY

Aspects of the present disclosure are directed to increasing traffic safety in general. In particular, the target object selection in connection with aborted or interrupted lane change processes is to be improved, in particular accelerated, compared to the known methods.

Some aspects of the present disclosure are illustrated in the subject matter of the independent claims. Other aspects are disclosed in the subject matter of the dependent claims, the following description, and the figures.

In some examples, a method is disclosed for selecting a target object for a longitudinal guidance system of a motor vehicle. At least one driving parameter of the motor vehicle is adapted by the longitudinal guidance system, based on the selected target object. As mentioned at the outset, the target object may be another motor vehicle preceding the motor vehicle. For example, the longitudinal guidance system can intervene in a longitudinal guidance of the motor vehicle in such a way that the motor vehicle gears or adapts the present driving speed thereof toward or to a distance to be maintained with respect to the preceding motor vehicle.

In some examples, a vehicle guidance system is disclosed for operating a motor vehicle in an at least semi-automated manner, comprising a transverse guidance system, a longitudinal guidance system, and an assessment device, wherein the electronic vehicle guidance system is designed to carry out any of the methods or processes disclosed herein.

In some examples, a motor vehicle is disclosed, comprising such an electronic vehicle guidance system.

In some examples, a method is disclosed for operating a motor vehicle in an at least semi-automated manner by means of an electronic vehicle guidance system, wherein a command for adapting the at least one driving parameter to the selected target object is generated based on the target object selection.

Some aspects of the present disclosure encompass refinements that include features described in connection with the refinements of the methods and processes. For this reason, the corresponding refinements of the further aspects according to the invention are not described again here.

Some aspects of the present disclosure also encompass combinations of features of the described embodiments.

DESCRIPTION OF THE DRAWINGS

Exemplary embodiments are described hereafter. In the drawings.

DETAILED DESCRIPTION

Figure 1:
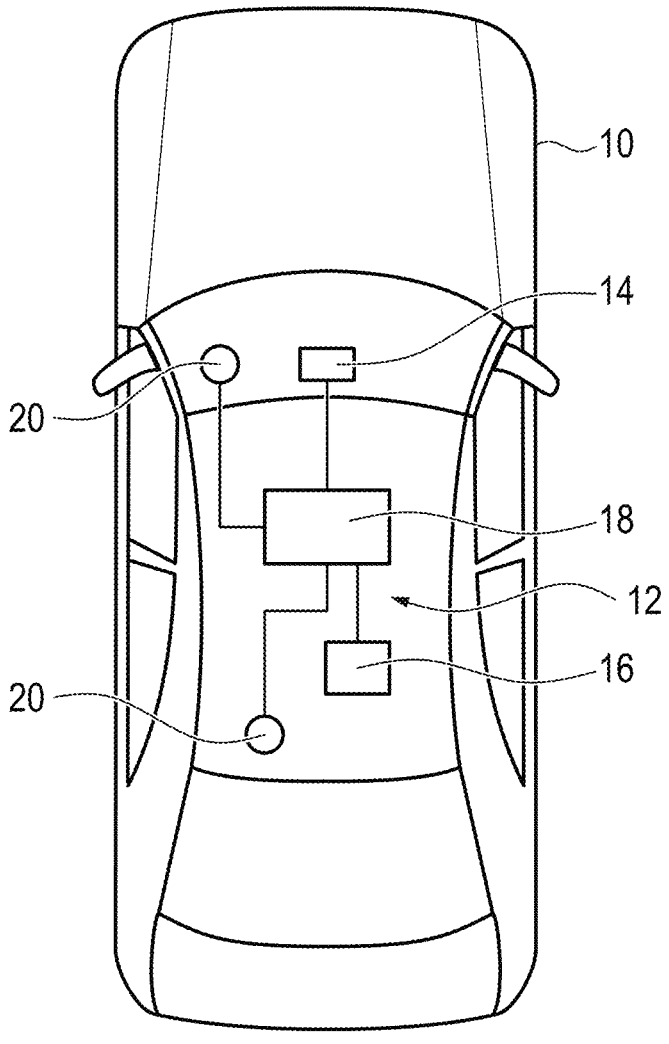
FIG. 1 shows a schematic representation of a motor vehicle comprising an electronic vehicle guidance system, according to some aspects of the present disclosure.

The exemplary embodiments described hereafter are preferred exemplary embodiments of the invention. In the exemplary embodiments, the described components in each case represent individual features of the invention which are to be considered independently of one another and which each also refine the invention independently of one another and, as a result, shall also be considered to be an integral part of the invention, either individually or in a combination other than the one shown. Furthermore, the described exemplary embodiments can also be supplemented with additional of the above-described features of the invention.

In the figures, functionally equivalent elements are each denoted by the same reference numerals.

According to the method described here, the motor vehicle is initially operated along an ego driving lane. In other words, the motor vehicle is initially driving in the ego driving lane. During this operation, at least one driving parameter of the motor vehicle is adapted by the longitudinal guidance system based on a first target object arranged ahead of the motor vehicle along the ego driving lane. The target object may be another motor vehicle driving in the same lane as the ego vehicle, with a predetermined distance maintained between the vehicles.

Next, an at least semi-automated lane change process for the motor vehicle is initiated by a transverse guidance system of the vehicle. This can be prompted, for example, by the driver of the motor vehicle, who might actuate a turn signal to initiate the lane change process. The lane change process includes a change from the ego driving lane to a target driving lane adjoining the ego driving lane. The lane change process further involves a change from the first target object to a second target object located ahead of the motor vehicle, at least partly along the target driving lane. The second target object is preferably entirely located along the target driving lane. However, in some cases, only a part, especially a predominant part, of the second target object is along the target driving lane. This situation arises, for example, when the second target object is an oversized truck that protrudes beyond the boundaries of the target driving lane.

The change to the second target object preferably occurs with the start of the lane change process, allowing the motor vehicle to adapt its speed to that of the second or new target object during the lane change process.

The described lane change process can be interrupted or aborted before completion. The interruption or abortion can occur semi-automatically or fully automatically by the transverse guidance system, such as when a third vehicle is approaching from behind with excessive speed. Alternatively, or in addition, the lane change process can be aborted or interrupted by a steering intervention from the driver of the ego vehicle.

If the lane change process is interrupted or aborted, an assessment device determines the likelihood that the motor vehicle will return to the ego driving lane during the remainder of the trip. The likelihood is preferably determined concurrently with the abortion or interruption of the lane change process. The likelihood determination thus preferably occurs simultaneously with the abortion or interruption. This allows for a prompt determination of how likely it is that the motor vehicle, due to the interruption or abortion, will return to the ego driving lane. Based on the determined likelihood for the remainder of the trip, either the second target object is maintained, the first target object is selected again, or no target object is selected for the longitudinal guidance system.

This approach prevents control actions from being unnecessarily applied to a target object in the former target driving lane, despite the lane change process being aborted. Instead, appropriate control actions can be applied again to the target object along the original ego driving lane, improving traffic flow and increasing safety in general.

The present disclosure also includes embodiments that provide additional advantages.

According to one embodiment, the likelihood is determined based on a current status of the longitudinal guidance system during the interruption or abortion of the lane change process and/or based on a current status of the transverse guidance system during the interruption or abortion of the lane change process. In other words, information exchange can occur between the longitudinal guidance system and the transverse guidance system to determine the likelihood. The assessment device can thus receive information regarding the respective status of one or both systems and evaluate this information to ascertain the likelihood. The status of the longitudinal guidance system can, for example, include whether it was active or inactive when the lane change process was interrupted or aborted. Moreover, the status can include which target object the longitudinal guidance system was prepared for or set for at the point in time at which the lane change process was interrupted or aborted. For example, a predetermined likelihood value can be assigned to the respective status or information contained in a respective status. Based on the likelihood values and an algorithm, the assessment device can then ascertain the overall likelihood that the motor vehicle will remain in or will change (change back) to the ego driving lane.

The current status of the transverse guidance system preferably includes at least one piece (portion) of information regarding a steering torque currently requested by the transverse guidance system. The requested steering torque can involve steering the motor vehicle back toward the ego driving lane. Such information, specifically regarding the steering torque leading back to the ego driving lane, can have a comparatively high likelihood value for the motor vehicle returning to the ego driving lane during the remainder of the trip. The assessment device can consequently decide that the first target object is again selected for the remainder of the trip. The steering torque requested by the transverse guidance system, however, can also be zero, meaning that no system-side steering is taking place any longer. In this case, it is possible to ascertain, for example, based on the moment of inertia of the motor vehicle whether it is likely to continue moving toward the target driving lane or to return to the ego driving lane.

For the described case where system-side steering by the transverse guidance system no longer takes place, it may be advantageous to additionally consider the roadway curvature along the ego driving lane and/or the target driving lane, or the roadway cross slope along the ego driving lane and/or the target driving lane to determine the likelihood. Based on these factors, it is possible to determine the likelihood that the motor vehicle will also return to the ego driving lane without system-side steering. The cross slope can be measured by an inertial measurement unit (IMU) of the motor vehicle or obtained from a digital map stored in a navigation system. In other words, the described pieces of information can be provided by other vehicle systems, which may be part of a surroundings sensor system.

Alternatively, or in addition, it is also possible to detect a current driver steering torque, which describes whether and how a driver of the motor vehicle manually intervenes in the steering process. The driver steering torque can be detected by a steering torque sensor or based on driver monitoring, such as through cameras in the passenger compartment. For example, if the driver actively steers in the direction of the ego driving lane, the assessment device can assume a value close to 100% for the likelihood that the motor vehicle will return to the ego driving lane during the remainder of the trip. With such a high likelihood, the first target object will be selected again for the longitudinal guidance system.

By additionally considering the factors described here, the likelihood determination is advantageously further enhanced.

Alternatively, or in addition, it is also possible to ascertain the likelihood that the motor vehicle will change back to the ego driving lane based on route navigation provided for the motor vehicle. For example, if the route navigation indicates that the motor vehicle is to take a highway off-ramp a few hundred meters ahead and a passing maneuver is aborted, it is possible to ascertain a comparatively high likelihood value that the motor vehicle will change back to the ego driving lane. The high likelihood value can exceed 70 or 75%, for example.

Alternatively, or in addition, the likelihood can also be determined based on a distance and/or a change in the distance between at least one tire of the motor vehicle and a separating line between the ego driving lane and the target driving lane during the interruption or abortion of the lane change process. A separating line in connection with the present disclosure shall particularly refer to a roadway marking that visually separates the ego driving lane and the target driving lane. The described distance, or the so-called distance to line crossing (DLC), is accordingly an indicator for the likelihood that the ego vehicle will or will not return to the ego driving lane. Generally, a larger distance can indicate a higher likelihood that the motor vehicle will remain in or return to the ego driving lane. If the lane change process, however, is not aborted until a smaller distance or even until the separating line has already been partly crossed, the likelihood that the ego vehicle will return to the ego driving lane is comparatively lower.

Preferably, the likelihood can also be determined based on whether, and to what extent, the motor vehicle has already at least partly crossed the separating line during the interruption or abortion of the lane change process.

According to another embodiment, a request is provided to a driver of the motor vehicle through a user interface to confirm the selected target object. In other words, the assessment device can present the selected target object for the driver to choose. The user interface can be a graphical interface, such as a screen in the passenger compartment, where the driver can select one of several target objects displayed on the screen through touch operation. Alternatively, or in addition, the display can be provided on an instrument cluster, such as a display behind the steering wheel.

For application cases or situations that may arise with the method and are not explicitly described here, it may be provided that an error message and/or a request for user feedback is output, or a standard setting and/or a predetermined initial state is set.

FIG. 1 shows a schematic representation of a motor vehicle 10 comprising an electronic vehicle guidance system 12. The electronic vehicle guidance system 12 can include a longitudinal guidance system 14, a transverse guidance system 16, an assessment device 18, and a surroundings sensor system including one or more sensors 20.

The assessment device 18 can be designed to receive information from the longitudinal guidance system 14 and/or the transverse guidance system 16, including a current status of one of the systems 14, 16. Moreover, the assessment device 18 can be designed to receive information regarding surroundings of a motor vehicle 10 from the sensors 20 of the surroundings sensor system. For example, the sensors 20, or at least one of them, can be designed as a camera sensor 20, which can be used, for example, to detect how far the motor vehicle 10, or at least a tire of the motor vehicle 10, is located away from a roadway demarcation line 22 (see FIG. 2) at a given point in time. The assessment device 18 can include a processing unit designed to calculate a likelihood for the vehicle's further course based on information from the longitudinal guidance system 14, the transverse guidance system 16, and other described information. For example, the processing unit can execute a computer program containing corresponding commands.

Figure 2:
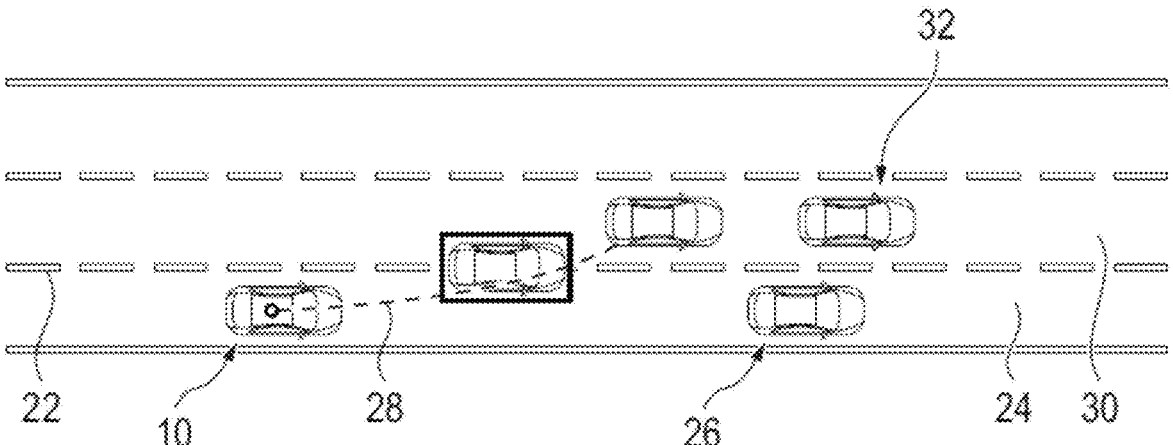
FIG. 2 shows a schematic representation of an exemplary lane change situation, according to some aspects of the present disclosure.

FIG. 2 shows a schematic representation of an exemplary lane change situation. In the illustrated situation, the motor vehicle 10 or ego vehicle is traveling along the ego driving lane 24. During operation of the motor vehicle 10 in the ego driving lane 24, the current driving speed of the motor vehicle 10 can be adapted to a first target object 26 by the longitudinal guidance system 14, where the first target object 26 in this example is another vehicle ahead of the ego vehicle 10 in the ego driving lane 24.

The dotted line 28 in FIG. 2 indicates a trajectory 28 of the motor vehicle 10 during a lane change process from the ego driving lane 24 to the adjoining target driving lane 30. Another motor vehicle 32 is driving along a target driving lane 30, which can be selected by the assessment device 18 as a new target object 32 for the motor vehicle 10 as soon as it is in the target driving lane 30.

Figure 3:
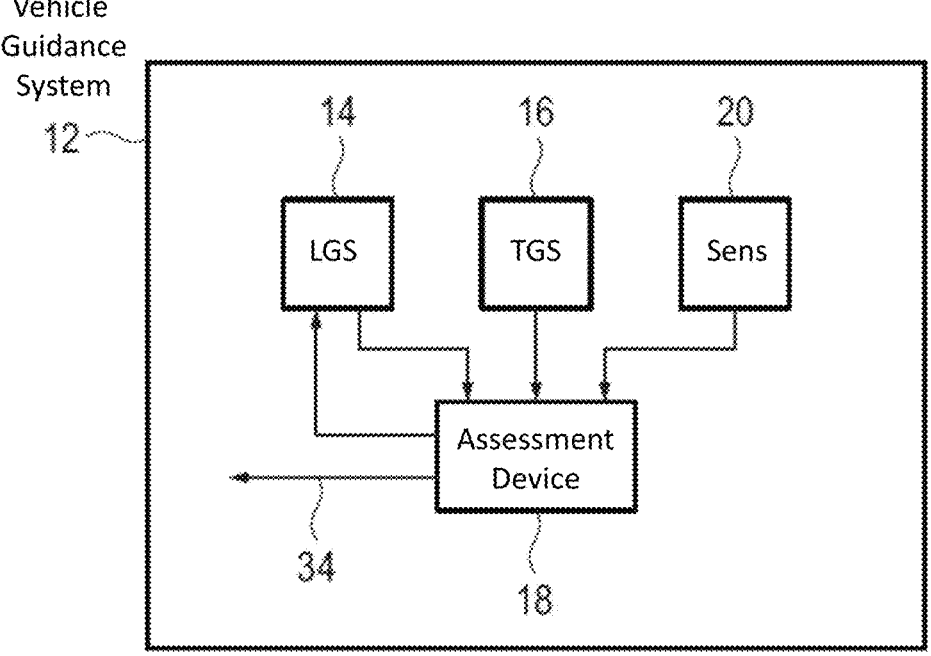
FIG. 3 shows a schematic representation of an electronic vehicle guidance system, according to some aspects of the present disclosure.

FIG. 3 shows a schematic representation of an electronic vehicle guidance system 12 according to one embodiment of the present disclosure. The electronic vehicle guidance system 12 here includes a longitudinal guidance system 14, a transverse guidance system 16, further sensors 20 of a surroundings sensor system of the motor vehicle 10, and an assessment device 18. The assessment device 18 can receive information regarding the respective status of one of the systems 14, 16 from the longitudinal guidance system 14 or from the transverse guidance system 16. The assessment device 18 can receive information regarding vehicle surroundings from the sensors 20, where the information influences the determination of the likelihood that the motor vehicle 10 will return to the ego driving lane 24 during the remainder of the trip after a lane change process has been aborted. If the determined likelihood meets a minimum value, the assessment device 18 can suggest to the longitudinal guidance system 14 that the first target object 26 in the ego driving lane 24 should be selected again as the new target object. Optionally, the assessment device 18 may not suggest a target object if the determined likelihood is below the threshold. The latter case is illustrated by the arrow 34 in FIG. 3.

Figure 4:
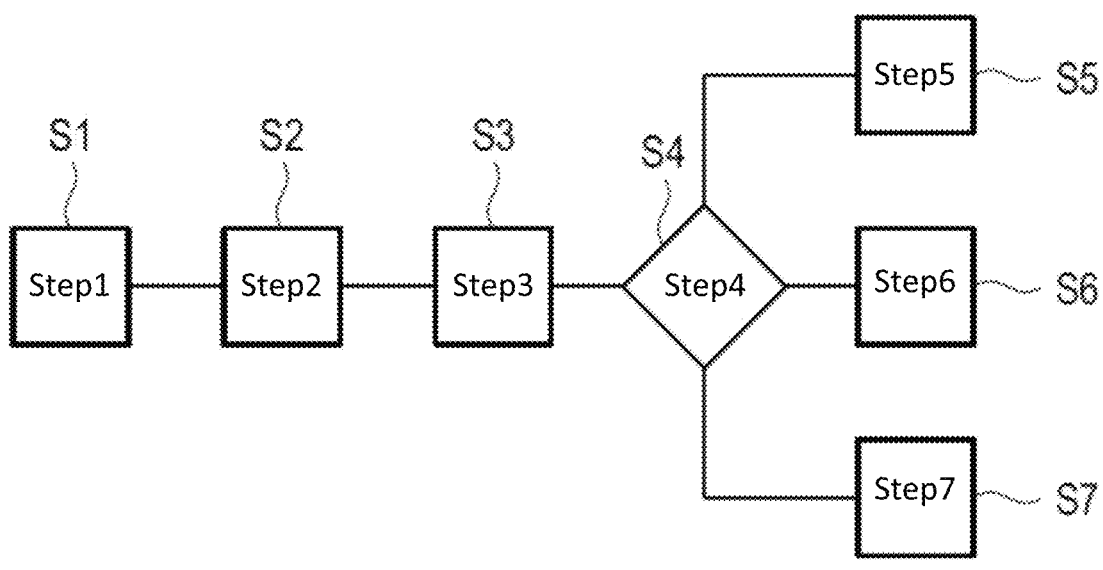
FIG. 4 shows a schematic representation of a method for selecting a target object for a longitudinal guidance system of a motor vehicle, according to some aspects of the present disclosure.

FIG. 4 shows a schematic representation of a method for selecting a target object 26, 32 for a longitudinal guidance system 14 of a motor vehicle 10. At least one driving parameter of the motor vehicle 10 is adapted by the longitudinal guidance system 14 based on the selected target object 26, 32.

In step S1, the motor vehicle 10 is initially operated along an ego driving lane 24, with the at least one driving parameter adapted by the longitudinal guidance system 14 based on a first target object 26 driving ahead of the motor vehicle 10 in the ego driving lane 24. In step S2, an at least semi-automated lane change process is initiated for the motor vehicle 10 by the transverse guidance system 16, including a change from the ego driving lane 24 to a target driving lane 30 adjoining the ego driving lane 24. In addition, the lane change process includes a change from the first target object 26 toward a second target object 32, where the second target object 32 is arranged ahead of the motor vehicle 10 in the target driving lane 30.

In step S3, the lane change process is aborted by the transverse guidance system 16. This may be due, for example, to the surroundings sensor system of the motor vehicle 10 recognizing that another vehicle is approaching from behind with excessive speed in the target driving lane 30. In step S4, the assessment device 18 of the motor vehicle 10 ascertains a likelihood that the motor vehicle 10 will return to the ego driving lane 24 during the remainder of the trip. Based on the ascertained likelihood, three possible suggestion options result for the assessment device 18 in this example. If the likelihood determination shows that the motor vehicle 10 is not likely to return to the ego driving lane 24 during the remainder of the trip, the second target object 32 is maintained as the target object in step S5. However, if the likelihood determination shows that it is likely that the motor vehicle 10 will return to the ego driving lane

24 during the remainder of the trip, the first target object 26 is again selected as the target object in step S6. Alternatively, the target object selection may be omitted in step S7, which may be useful, for example, when no clear likelihood can be ascertained. Alternatively, or in addition, step S7 can include informing the driver of the motor vehicle 10 that no target object is currently selected for the longitudinal guidance system 14. Alternatively, or in addition, the driver can then manually select one of the possible target objects 26, 32 for the longitudinal guidance system 14, for example through a touch operation gesture on a touchscreen in the passenger compartment.

Figure 5:
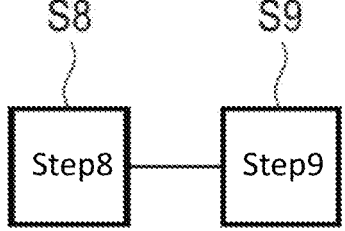
FIG. 5 shows a schematic representation of a method for operating a motor vehicle, according to some aspects of the present disclosure.

FIG. 5 shows a schematic representation of a method for operating a motor vehicle 10. In the representation of FIG. 5, the method steps S1 to S5 or S1 to S6 or S1 to S7 described in connection with FIG. 4 are combined by the method step S8. In step S9, a command for adapting the at least one driving parameter to the selected target object 26, 32 is generated in accordance with the target object selection made in step S8.

Overall, the example shows how an improved method for selecting a target object for a longitudinal guidance system of a motor vehicle can be provided.

LIST OF REFERENCE NUMERALS

10 motor vehicle
12 electronic vehicle guidance system

14 longitudinal guidance system
16 transverse guidance system
18 assessment device
20 sensors
22 separating line, roadway demarcation line
24 ego driving lane
26 first target object
28 trajectory
30 target driving lane
32 second target object
34 arrow (no target object selection)

The invention claimed is:

1. A method for selecting a target object for a longitudinal guidance system of a motor vehicle, comprising:
   adapting at least one driving parameter of the motor vehicle based on a first target object while the motor vehicle is operated along a first driving lane;
   initiating, by a transverse guidance system of the motor vehicle, a lane change from the first driving lane to an adjacent second driving lane;
   transitioning from the first target object to a second target object based on the lane change; and
   determining, by an assessment device, a likelihood that the motor vehicle will return to the first driving lane if the lane change is interrupted or aborted by the transverse guidance system, wherein determining the likelihood comprises evaluating at least one operating parameter associated with the interruption or abortion of the lane change, and, based on the determined likelihood:
   maintaining the second target object,
   selecting again the first target object, or
   not selecting any target object.

2. The method of claim 1, wherein determining the likelihood is based on any one or more of the following, taken alone or in combination:
   a current status of the longitudinal guidance system of the motor vehicle during the interruption or abortion of the lane change;
   a current status of the transverse guidance system of the motor vehicle during the interruption or abortion of the lane change;
   a current roadway curvature along at least one of the first driving lane and the second driving lane;
   a current roadway cross slope along at least one of the first driving lane and the second driving lane;
   a current driver steering torque; and/or
   a route navigation provided for the motor vehicle.

3. The method of claim 2, wherein the current status of the transverse guidance system comprises information regarding a steering torque presently requested by the transverse guidance system.

4. The method of claim 1, wherein determining the likelihood is based on a distance and/or a change in a distance between at least one tire of the motor vehicle and a separating line between the first driving lane and the second driving lane during the interruption or abortion of the lane change process.

5. The method of claim 4, wherein the likelihood is determined based on whether, and to what extent, the motor vehicle has at least partly crossed the separating line during the interruption or abortion of the lane change process.

6. The method of claim 1, further comprising displaying a prompt on a user interface of the motor vehicle that requests the driver to confirm or adjust the selected target object based on the likelihood determination.

7. The method of claim 1, wherein determining the likelihood further includes using data from an inertial measurement unit (IMU) of the motor vehicle or a digital map to assess roadway conditions influencing a trajectory of the vehicle.

8. An electronic vehicle guidance system for operating a motor vehicle in at least a semi-automated manner, the system comprising:

a longitudinal guidance system configured to adapt at least one driving parameter of the motor vehicle based on a target object;

a transverse guidance system configured to initiate a lane change from a first driving lane to a second driving lane;

an assessment device configured to:

determine a likelihood that the motor vehicle will return to the first driving lane upon interruption or abortion of the lane change by the transverse guidance system, wherein determining the likelihood comprises evaluating at least one operating parameter associated with the interruption or abortion of the lane change; and control the longitudinal guidance system to maintain, select again, or cease selecting a target object based on the determined likelihood.

9. The system of claim 8, wherein the assessment device is further configured to determine the likelihood based on any one or more of the following, taken alone or in combination:

a current status of the longitudinal guidance system during the interruption or abortion of the lane change;

a current status of the transverse guidance system during the interruption or abortion of the lane change;

a current roadway curvature along at least one of the first driving lane and the second driving lane;

a current roadway cross slope along at least one of the first driving lane and the second driving lane;

a current driver steering torque; and a route navigation provided for the motor vehicle.

10. The system of claim 9, wherein the assessment device is further configured to determine the likelihood based on information regarding a steering torque presently requested by the transverse guidance system.

11. The system of claim 8, wherein the assessment device is further configured to determine the likelihood based on a distance and/or a change in the distance between at least one tire of the motor vehicle and a separating line between the first driving lane and the second driving lane during the interruption or abortion of the lane change process.

12. The system of claim 11, wherein the assessment device is further configured to determine the likelihood based on whether, and to what extent, the motor vehicle has at least partly crossed the separating line during the interruption or abortion of the lane change process.

13. The system of claim 8, further comprising a user interface configured to provide a request to a driver of the motor vehicle to confirm the selected target object.

14. The system of claim 8, wherein the assessment device is further configured to use data from an inertial measurement unit (IMU) of the motor vehicle or a digital map to assess roadway conditions influencing the vehicle's trajectory.

15. A method for operating a motor vehicle in an at least semi-automated manner, comprising:

adapting at least one driving parameter of the motor vehicle based on a first target object while the motor vehicle is operated along a first driving lane;

initiating, by a transverse guidance system of the motor vehicle, a lane change from the first driving lane to an adjacent second driving lane;

transitioning from the first target object to a second target object based on the lane change;

determining, by an assessment device, a likelihood that the motor vehicle will return to the first driving lane if the lane change is interrupted or aborted by the transverse guidance system, wherein determining the likelihood comprises evaluating at least one operating parameter associated with the interruption or abortion of the lane change;

based on the determined likelihood, controlling the longitudinal guidance system to:

maintain the second target object, select again the first target object, or not select any target object; and generating a command for adapting the at least one driving parameter of the motor vehicle to the selected target object based on the target object selection.

16. The method of claim 15, wherein determining the likelihood is based on any one or more of the following, taken alone or in combination:

a current status of the longitudinal guidance system of the motor vehicle during the interruption or abortion of the lane change;

a current status of the transverse guidance system of the motor vehicle during the interruption or abortion of the lane change;

a current roadway curvature along at least one of the first driving lane and the second driving lane;

a current roadway cross slope along at least one of the first driving lane and the second driving lane;

a current driver steering torque; and a route navigation provided for the motor vehicle.

17. The method of claim 16, wherein the current status of the transverse guidance system includes information regarding a steering torque presently requested by the transverse guidance system.

18. The method of claim 15, wherein determining the likelihood is based on a distance and/or a change in a distance between at least one tire of the motor vehicle and a separating line between the first driving lane and the second driving lane during the interruption or abortion of the lane change process.

19. The method of claim 18, wherein the likelihood is determined based on whether, and to what extent, the motor vehicle has at least partly crossed the separating line during the interruption or abortion of the lane change process.

20. The method of claim 15, further comprising providing a request to a driver of the motor vehicle via a user interface of the motor vehicle to confirm the selected target object.

* * * * *